Jan. 15, 1963 A. W. SLIWA ET AL 3,073,950
COLOR WHEEL
Filed July 15, 1959 3 Sheets-Sheet 1

Inventors
Arthur W. Sliwa
Walter J. Mazanek
By *[signature]* Attys

Jan. 15, 1963   A. W. SLIWA ET AL   3,073,950
COLOR WHEEL
Filed July 15, 1959   3 Sheets-Sheet 3
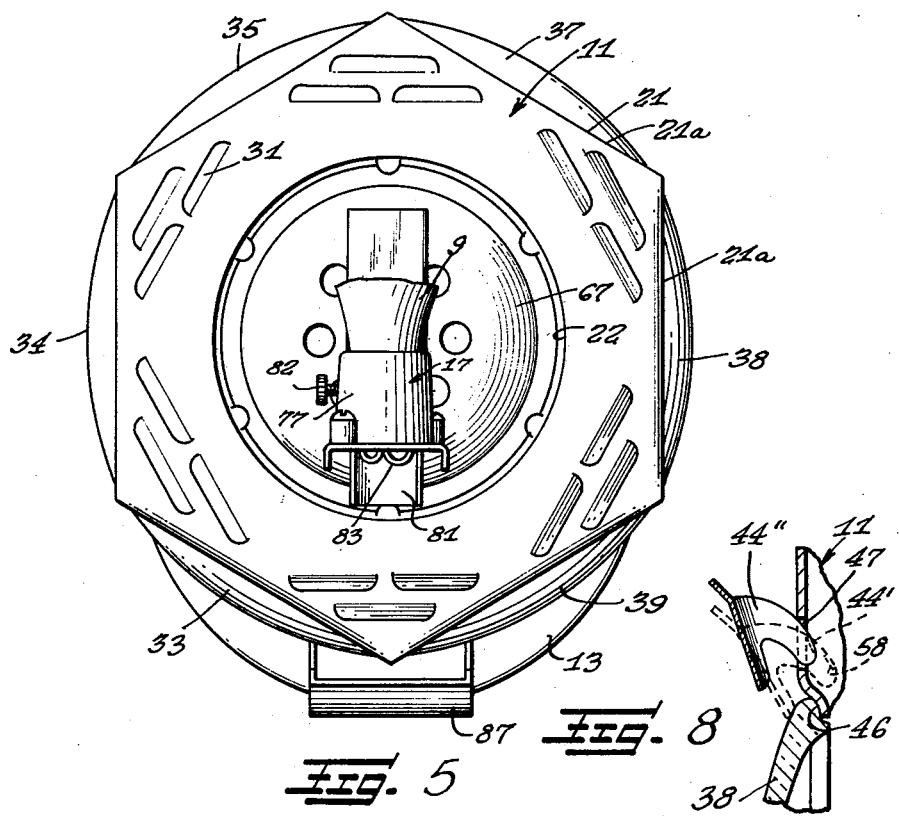
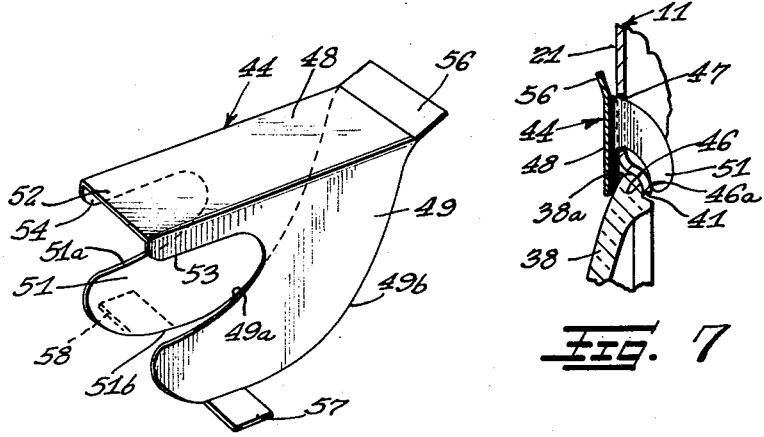
Inventors
Arthur W. Sliwa
Walter J. Mazanek
By Hill, Sherman, Meroni, Gross & Simpson Attys United States Patent Office 3,073,950
Patented Jan. 15, 1963

3,073,950
COLOR WHEEL
Arthur W. Sliwa, 6617 N. Longmeadow, and Walter J. Mazanek, 6649 N. Longmeadow, both of Lincolnwood, Ill.
Filed July 15, 1959, Ser. No. 827,390
4 Claims. (Cl. 240—10.1)

The present invention relates to an improved lighting assembly and more particularly to a display light wherein a reflector type lamp is arranged to sequentially direct its rays through a plurality of lenses of different colors in a mechanism which has features for improved operation, adjustment, and assembly.

The present invention contemplates provision of a lamp holding member for a reflector lamp mounted within a lens holding drum having a plurality of colored lenses removably mounted in the periphery of the drum and with the drum being rotatably driven to rotate about the lamp. The assembly is mounted on a base to be adjustably tiltable about an axis at right angles to the axis of rotation of the drum for directing the light in different directions.

An object of the present invention is to provide a lighting assembly of the above character provided with an improved mechanism for removably mounting the colored lenses in the assembly to change or replace the individual lenses.

Another object of the invention is to provide an improved display lighting assembly of the type described with improved features for tiltably positioning the direction in which the rays of the light are directed.

Another object of the invention is to provide a display light wherein colored lenses are driven past a reflector light and wherein different lights may be selectively manually positioned in front of the reflector light and wherein the lenses may be selectively stopped in front of the light without turning off the light.

Another object of the invention is to provide a display light mechanism with improved features of balance and operation for ease of adjustment, handling and use and for improved safety and longer operating wear.

Another object of the invention is to provide a display lamp mechanism which is adaptable for various size lamps and wherein the lamps may be easily removed and replaced.

A further object of the invention is to provide an improved display lamp which can be mounted in different operating positions.

Other objects and advantages will become more apparent with the teaching of the principles of the invention in connection with the disclosure of the preferred embodiments thereof in the specification, claims and drawings, in which:

FIGURE 5 is the top plan view of the mechanism of FIGURE 1 but with a cover plate removed;

FIGURE 6 is an enlarged detailed perspective view of a lens holding clip of the mechanism;

FIGURE 7 is the sectional view taken substantially along line VII—VII of FIGURE 1 showing the clip holding a lens in place; and FIGURE 8 is a sectional view similar to FIGURE 7 illustrating the positions of the clip as it is moved to release the lens.

As shown on the drawings:

Figure 1:
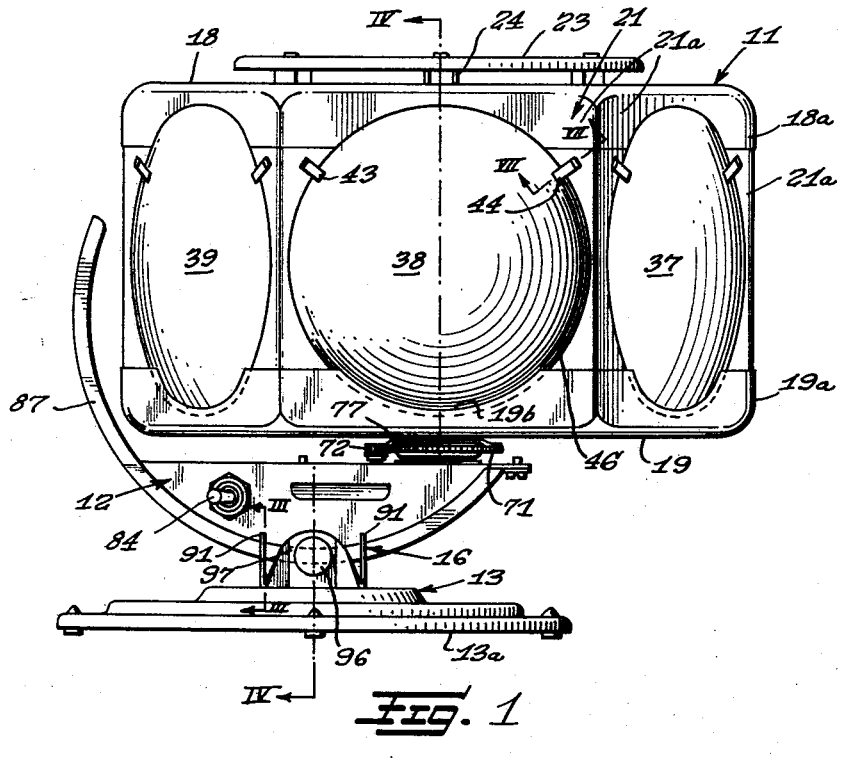
FIGURE 1 is a side elevational view of a display lighting assembly embodying the principles of the present invention.
Figure 4:
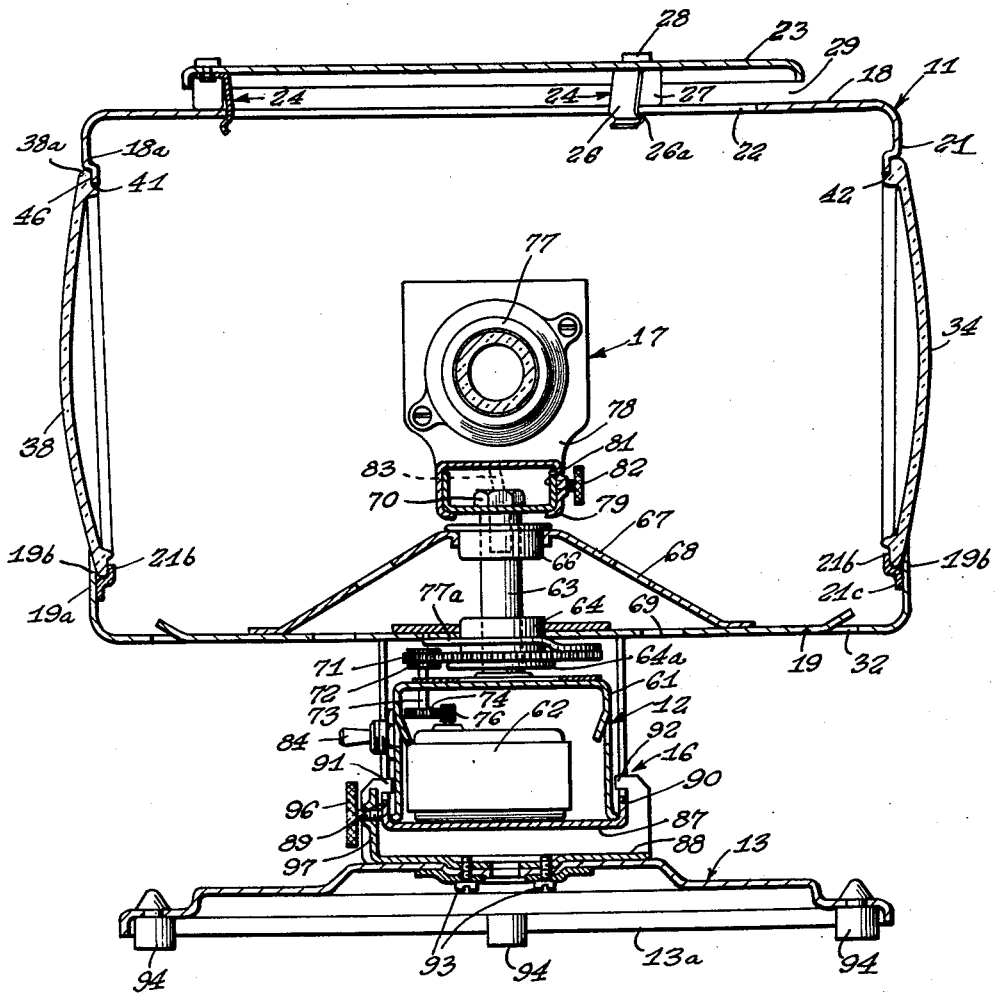
FIGURE 4 is a vertical sectional view taken substantially along line IV—IV of FIGURE 1.

As illustrated in FIGURES 1, 4 and 5, a light bulb or a lamp 9 of the reflector type is arranged to be stationarily mounted and a plurality of colored lenses of different colors are carried sequentially past the front of the lamp, being mounted in the lens holding member or drum 11. The drum is rotatably mounted for rotation about its axis on a support member 12. The support member 12 is mounted on a base 13 for tilting movement to tilt the lamp 9 and the lens holding drum 11 about an axis extending transverse laterally of the axis of the drum, and for this purpose a tilting mount 16 is positioned between the support member 12 and the base 13. Mounted stationarily within the lens holding drum 11 but tiltable therewith is a lamp holding member 17.

The lens holding drum 11, in greater detail, is formed of a suitable material such as sheet metal formed into a hollow shell with a top wall 18, a bottom wall 19 and an outer circumferential wall 21. The circumferential wall is arranged with flat surfaces 21a to provide sockets for holding the lenses as will be described.

The top wall 18 is provided with a centrally located ventilation and bulb replacement opening 22 which is shown as circular in shape. During operation the opening 22 is closed by a plate 23. The plate 23 and other parts of the mechanism are conveniently formed of sheet metal or other suitable light weight easily formed serviceable material which is inexpensive to form and can be attractively painted or otherwise colored or coated. The cover plate 23 is provided with a plurality of mounting brackets 24 each of which includes a radially outwardly biased spring clip 26 with an end 26a formed with a retaining bump thereon. The mounting brackets include a spacer element 27 which rests on the top 18 to hold the cover plate 23 above the drum top wall 18 and provide an airflow space 29 around the annular edge of the cover. The brackets are held on the cover by rivets 28 or the like. Additional ventilation through the drum is provided by punched slots 31 in the top wall 18 and 32 in the bottom wall 19.

The outer wall 21 is provided, in each of the flat surface sections 21a, with a lens opening, such as illustrated by the openings 41 and 42 for the lenses 38 and 34 respectively, FIGURES 1, 4 and 7. Each of the lens openings is formed to provide a socket to receive a lens and is provided with means to hold the lens in the socket in a removable manner for ease of replacing or interchanging lenses.

As illustrated in FIGURES 1 and 4, the bottom wall 19 of the drum is formed with an upwardly turned flange 19a which overlaps the material 21c that forms the outer wall. The top wall 18 is similarly formed with a downturned flange 18a that telescopingly overlaps the material 21c of the outer wall so that the entire outer wall 21 is constituted of the immediate material 21c with the flanges 18a and 19a. The flange 19a is extended past the lens openings, as shown for openings 41 and 42, to form an outer holding flange 19b for the base of the lens, as shown for lenses 34 and 38. The base of the lens is prevented from moving inwardly by flange 21b formed in the material 21c. The lenses are set down between the flanges 19b and 21b, and are held in place by releasable clips 43 and 44 for the lens 38. The retaining or holding means for each of the lenses is of substantially identical construction and therefor only lens 38 and its socket will be described in detail.

The inner flange 21b is extended completely around the lens to form a socket 46 against which the outer edge or flange 38a of the lense 38 is held. The releasable clips 43 and 44 are of improved construction and will be described in detail, particularly in connection with FIGURES 6, 7 and 8.

The clips such as 44 extend through a clip slot 47 formed into the outer wall 21 of the drum. The clips are formed of suitable material such as sheet metal which is formed of an integral piece bent to form a back 48 with sides turned downwardly therefrom to form arcuate wall engaging fingers 49 and 51 and to form lens engaging fingers 53 and 54 which extend downwardly from an extended portion 52 of the back 48. The wall engaging fingers have arcuate concave upper edges 49a and 51a, the ends of which engage the axially inner surface 46a of the lens sockets adjacent the lens openings 41. The wall engaging fingers have lower arcuate edges 49b and 51b which facilitate the fingers sliding in the slot 47 when the clip is lifted to release position. The back 48 is provided with a lifting ear 56 so that the slot can be gripped manually or with a tool for pivoting the clip and releasing the lens. Laterally extending integral retaining tabs 57 and 58 extend outwardly from the lower edges 49b and 51b of the wall engaging fingers.

As illustrated in FIGURE 8, when the clip is to be released, it is first drawn axially outwardly by lifting outwardly on the ear of 56 to move the clip to the dotted line position 44'. The clip then may be moved radially and axially outwardly to the solid line position 44" of FIGURE 8 in which position the lengs 38 is released from its socket 46. To re-attach a new lens, the new lens is set into the socket to be held at its lower edge between the flanges 19b and 21b, as illustrated in FIGURE 4, and the clip is moved from the position of 44" through the position 44' (of FIGURE 8) and to the holding position of FIGURE 7.

The support member 12 includes a motor housing 61 with a drive motor 62 therein. The support member also includes a bearing post 63 mounted to the top of the motor housing and projecting up through the axial center of the drum 11. The drum is rotatably mounted on the bearing post by hubs 64 and 66. The lower bearing hub 64 is secured to the bottom or base 19 of the drum and the upper hub 66 is secured to the apex end of a conical shaped member 67 which has its lower end secured to the upper surface of the bottom wall 19 of the drum. Vent holes 68 and 69 are provided through the conical shaped member and the bottom of the drum.

The drum is driven by a gear 71 which is driven by a meshing pinion 72 mounted on a shaft 73 which is supported by the motor housing 61. On the lower end of the shaft 73 is a gear 74 driven by a motor driven pinion gear 76. The gear 71 is rotatably mounted on the hub 64 and held thereon by a lower flange 64a on the hub. The gear drives the lens holding drum through a slip clutch 77a which is illustrated in the form of a spring type clutch which expands axially against the upper surface of the gear 71 and against the lower surface of the drum wall 19 and will permit the gear to be rotated on the hub 64a and permit the drive motor 62 to continue rotation when the drum 11 is held with a predetermined stopping torque such as by being manually held. This will permit the operator to either hold the drum when a desired color of lens is front of the lamp 9, or without stopping the motor 62, to rotate the drum to bring the desired lens in front of the lamp.

The lamp 9 is a reflector or flood type lamp bulb and is threaded in a socket 77 mounted on bracket 78 which has a lower channel member 79 slidably mounted on a horizontal slide 81 secured to the top of the bearing post 63, such as by a threaded stud 70. Thus the lamp is non-rotatably mounted at the top of the bearing post 63 and will tilt therewith. The horizontal position of the lamp can be adjusted to regulate its position with respect to the lenses and to accommodate different size lamps by releasing a locking screw 82 which is threaded into the side of the channel member to bear against the slide 81.

Figure 2:
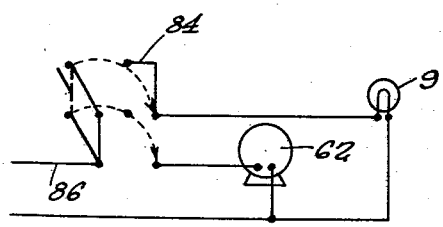
FIGURE 2 is a circuit diagram for the electrical circuitry of the mechanism of FIGURE 1.

The bearing post 63 may be hollow to accommodate wires 83 connected to the lamp socket 77. A suitable electrical supply line, not shown, leads to a switch 84 mounted on the motor housing 61 for controlling operation of the motor 62 and the lamp 9. The circuit diagram is illustrated in FIGURE 2 with a supply line 86 connecting to the motor 62 and lamp 9 through a conventional two circuit three position switch, illustrated in FIGURE 2. In the first position of the switch the circuits to the motor and lamp are broken, in the second position the circuit is made to the lamp alone, and in the third position both the motor and lamp are actuated. This permits stopping the rotation of the lens drum when a desired color of lenses is in front of the lamp with the lamp remaining on.

Figure 3:
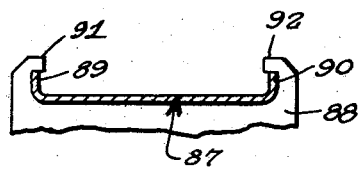
FIGURE 3 is a vertical sectional view taken substantially along line III—III of FIGURE 1.

The tilting mount 16 for tilting the position of the lamp and drum about a horizontal axis includes an arcuate track 87 and a track guide 88. The arcuate track, as illustrated in FIGURES 1, 3 and 4, curves about a center which is close to or coincides with the center of gravity of the assembly for balance of the mechanism in any position. The track 87 is secured to the motor housing 61 and has upturned the side flanges 89 and 90. The track guide 88 has guide fingers 91 which project over the flange 89 and guide fingers 92 which project over the flange 90 to hold the track on the base. The track guide 88 is secured to the base such as by screws 93. A locking screw 96 is threaded into a bracket 97 on the track guide 88 and bears against the upturned flange 89 to lock the track and guide in any relative adjusted position. The screw 96 is loosened for adjusting the tilted position of the drum and the drum adjusts about a tilting axis which extends transverse or laterally of the axis of rotation of the drum.

The base is formed of a generally circular shaped section of sheet metal with a down turned flange 13a at its edge and the base receives rubber feet 94 suitably secured thereto.

In summary, the lenses, such as 38, are positioned in the lens holding drum 11 by setting in the lower groove formed by the flanges 19b and 21b and by moving the clips such as clips 43 and 44 for lens 38 to the lens holding position, as illustrated in FIGURE 7. The motor 62 is turned on by the switch 84, which also turns on the lamp 9 and the drum is driven in rotation through the gearing connecting the motor to the drum through the clutch 77a. The drum rotates, sequentially carrying the colored lens past the front of the reflector lamp 9, and the position of the lamp is horizontally adjustable by releasing and re-tightening the adjusting screw 82. The lamp may be adjustably tilted to any desired angle of shine.

Thus it will be seen that I have provided an improved display lighting assembly which meets the objectives and advantages hereinbefore set forth. The mechanism is well balanced and will operate stably in any position. The mechanism is adaptable for simple and complete control and the rotation of the lens drum can be stopped in any desired position or the lens drum can be manually rotated independent of the motor. The mechanism is capable of continued long life operation at a low operating cost. The drum facilitates finger tip lens removable with the simplified and improved lens supporting arrangements. The mechanism is also well adapted to the use of various lamps and the lamp can be readily changed.

The mechanism is capable of many practical uses. It can be used for merchandise display, show windows, amusement centers, convention exhibits, church decorations, theatrical uses, recreation areas, Christmas tree lighting and for special effects of various types. The arrangement of lenses can be of varying desired types and the mechanism is showed with six different lenses which may include such colors as vermilion, red, valley green, majestic blue, golden amber, stipple clear and others. Unique effects can be obtained in the various sequences of colors.

The drawings and specification present a detailed disclosure of the preferred embodiments of the invention,

We claim as our invention:

1. In a lighting assembly having a lens holding drum with a base and a top and an outer circumferential wall extending therebetween and having a plurality of circumferentially spaced lens openings in said wall, and a plurality of lenses of different colors mounted in said openings, a support and drive assembly comprising a motor housing having a drive motor therein, a bearing post on said housing extending upwardly axially through the base of the drum with said drum base rotatably mounted thereon, a cone shaped member extending upwardly into the drum from the base and rotatably connected at its apex end to the bearing post and secured at its base end to the drum base, means connecting said motor to said drum for driving said drum in rotation on said post, a lamp holding member, means for adjustably nonrotatably mounting said lamp holding member on said post for adjustment transversely of the post, a base member, and means for tiltably mounting said motor housing on said base member for tilting the axis of said post and said drum.

2. A support and drive construction for a lighting assembly having a lens holding drum member with lenses facing radially away from an axis of rotation of the drum member, a motor housing non-rotatably situated below said drum member, a support post secured to the housing coaxial with the drum member non-rotatably supporting a lamp within said lenses and drum member, bearing means on said post supporting said drum member for rotation about said axis, a motor mounted in said housing connected to drive said lens holding drum member in rotation about said axis, a base having a horizontal support surface for supporting the housing on a planar surface without attachment thereto, a pair of arcuate tracks secured at the lower sides of said housing with said motor between said tracks and the center of gravity of elements carried on the tracks located at the center of curvature of the tracks, and means on said base for adjustably slidingly receiving said tracks so that the axis of rotation of the drum member may be tilted about said center of gravity without tipping on said base.

3. A support and drive construction for a lighting assembly having a lens holding drum member with lenses held facing radially away from an axis of rotation of the holding drum member, a motor housing beneath said drum member, a post rigidly secured to the housing and coaxial with the drum member, bearing means rotatably supporting said holding drum member on said post for rotation about said axis, means non-rotatably supporting a lamp within said lenses on said post, a motor in said housing, a drive mechanism connected between said motor and said drum member driving the drum member in rotation about said axis, a base supporting the assembly on a planar surface without requiring attachment thereto, an arcuate track secured to said housing with the center of gravity of elements carried on the track located at the center of curvature of the track, and means on said base for adjustably slidingly receiving said track so that said axis of rotation may be tilted about said center of gravity without tipping on said base.

4. A lighting assembly having a lens holding drum with a base and a top and an outer circumferential wall extending therebetween and having a plurality of circumferentially spaced lens openings in said wall, a plurality of lenses of different colors mounted in said openings, a support and drive assembly comprising a motor housing having a drive motor therein, a base rigidly supporting the housing, a bearing post rigidly mounted on said housing extending upwardly axially through the base of the drum with said drum base rotatably mounted thereon, a bearing surface between said post and said drum base, a hollow cone shaped member having its base secured to said drum base and extending upwardly into the drum and rotatably connected at its apex end to the bearing post so that the cone shaped member prevents the drum from tipping with respect to the post axis, means connecting said motor to said drum base for driving drum in rotation on said post, a lamp holding member mounted on said post within said drum, a base member connected to the housing for supporting it on a planar surface, and means for tiltably mounting said motor housing on said base member for tilting the axis of said post and said drum.

References Cited in the file of this patent

UNITED STATES PATENTS

| | | |
|---|---|---|
| 714,514 | Osbron | Nov. 25, 1902 |
| 1,272,505 | O'Hara | July 16, 1918 |
| 1,929,016 | Crossley | Oct. 3, 1933 |
| 2,168,799 | Korkosz et al. | Aug. 8, 1939 |
| 2,172,248 | Kost | Sept. 5, 1939 |
| 2,279,182 | Snyder | Apr. 7, 1942 |
| 2,353,258 | Mott | July 11, 1944 |
| 2,629,044 | Marfisi | Feb. 17, 1953 |
| 2,812,424 | Heugel | Nov. 5, 1957 |
| 2,878,374 | Steber et al. | Mar. 17, 1959 |